No. 781,061. PATENTED JAN. 31, 1905.
C. W. HARTMANN.
FOCUSING ATTACHMENT FOR CAMERAS.
APPLICATION FILED JAN. 9, 1904.

3 SHEETS—SHEET 1.

Witnesses:
Inventor:
Conrad W. Hartmann

No. 781,061. PATENTED JAN. 31, 1905.
C. W. HARTMANN.
FOCUSING ATTACHMENT FOR CAMERAS.
APPLICATION FILED JAN. 9, 1904.
3 SHEETS—SHEET 2.
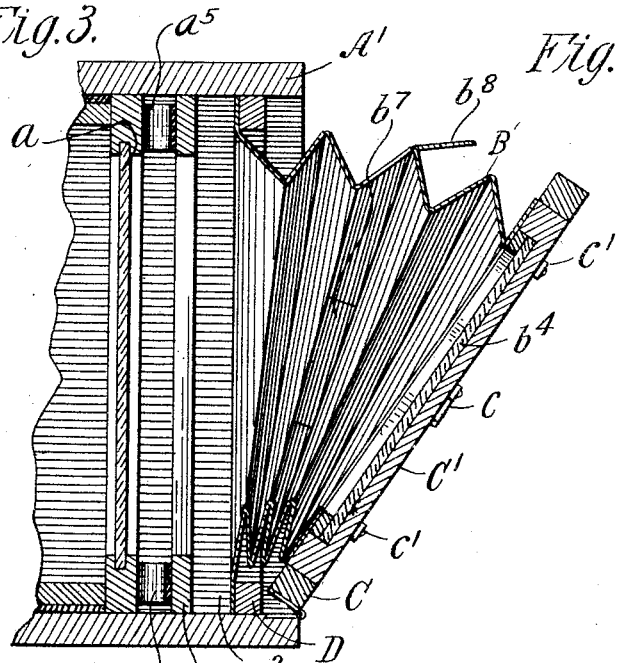
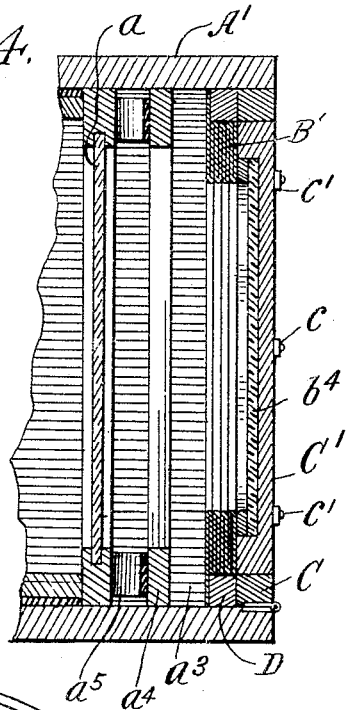
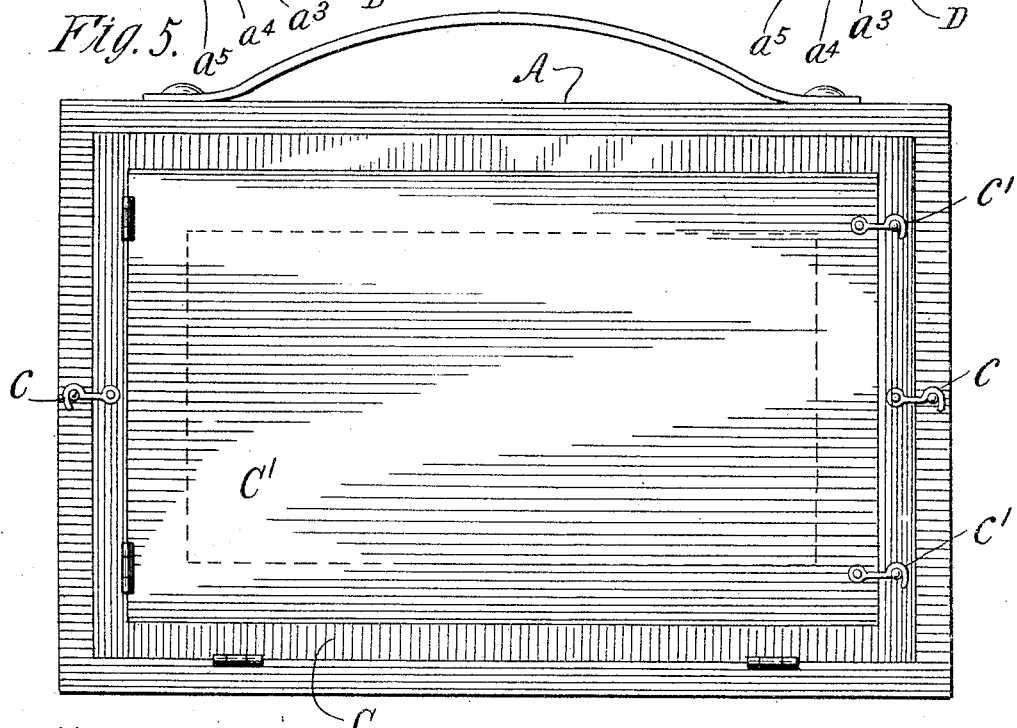
Witnesses:
Inventor
Conrad W. Hartmann No. 781,061. PATENTED JAN. 31, 1905.
C. W. HARTMANN.
FOCUSING ATTACHMENT FOR CAMERAS.
APPLICATION FILED JAN. 9, 1904.
3 SHEETS—SHEET 3.
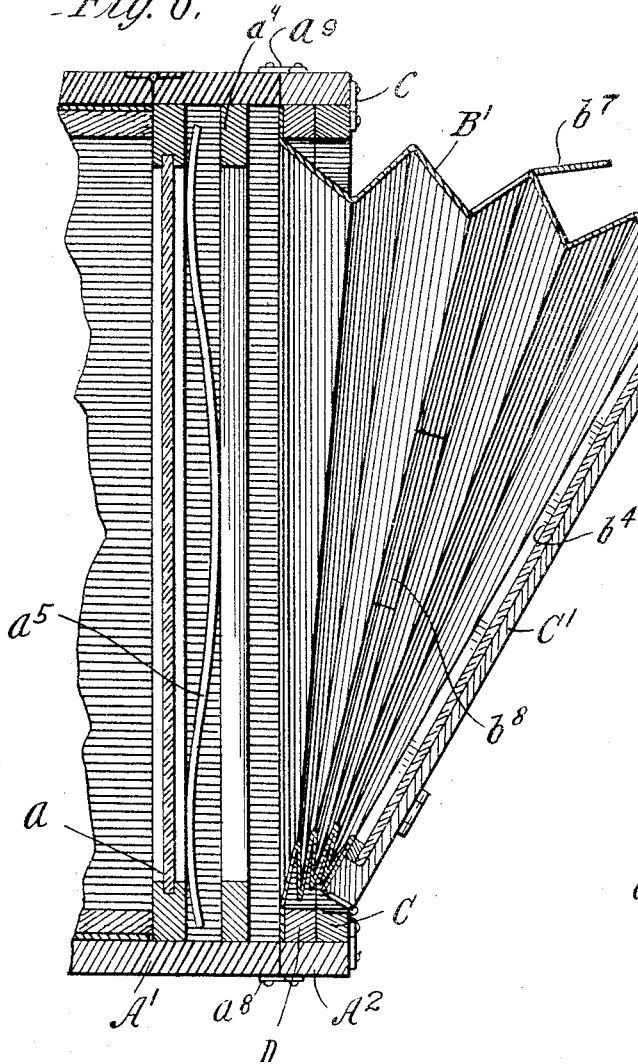
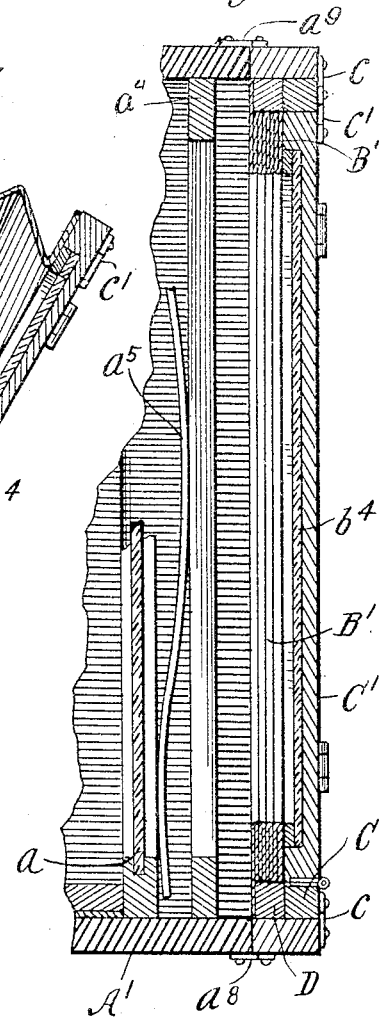

No. 781,061. Patented January 31, 1905.

UNITED STATES PATENT OFFICE.

CONRAD W. HARTMANN, OF CHICAGO, ILLINOIS.

FOCUSING ATTACHMENT FOR CAMERAS.

SPECIFICATION forming part of Letters Patent No. 781,061, dated January 31, 1905.

Application filed January 9, 1904. Serial No. 188,399.

*To all whom it may concern:*

Be it known that I, CONRAD W. HARTMANN, a citizen of the United States, and a resident of Chicago, Cook county, Illinois, (and whose post-office address is 6737 Elizabeth street, Chicago, Illinois,) have invented certain new and useful Improvements in Focusing Attachments for Cameras; and I do hereby declare that the following is a full, clear, and exact description of the same, reference being had to the accompanying drawings, and to the letters of reference marked thereon, which form a part of this specification.

This invention relates more particularly to a focusing attachment for photographic cameras adapted to dispense with the use of a black cloth or the like during the focusing while inspecting the image upon the ground-glass plate of the camera.

It has been common in cameras heretofore, especially of the larger sizes, to determine the focus, arrangement, and other details relating to the view to be photographed by inspection of the inverted image upon a ground-glass slide or screen in the back of the camera. A dark cloth is usually used, covering the operator's head and the rear of the camera, excluding the light while the operator is securing the desired adjustment. Inasmuch as the image is inverted on the screen, it is much more difficult for the operator, even though experienced, to secure the desired focus or to readily determine the adjustment and arrangement of the object to be photographed.

The object of this invention is to provide means whereby the operator is enabled to see the image in an upright or normal position and also to enable the black cloth ordinarily used to be dispensed with, thus rendering the outfit more compact and convenient for handling and transportation.

The invention consists in the matters hereinafter described, and more fully pointed out and defined in the appended claims.

Figure 1:
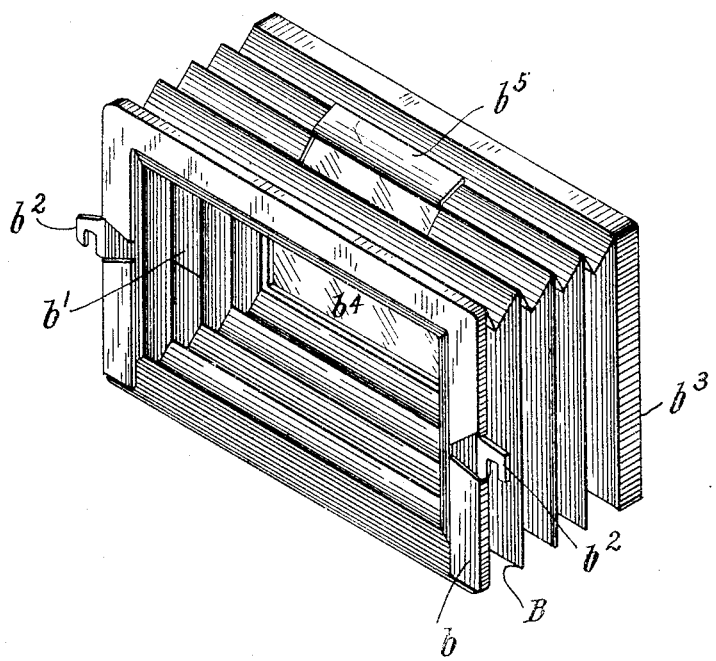
Figure 2:
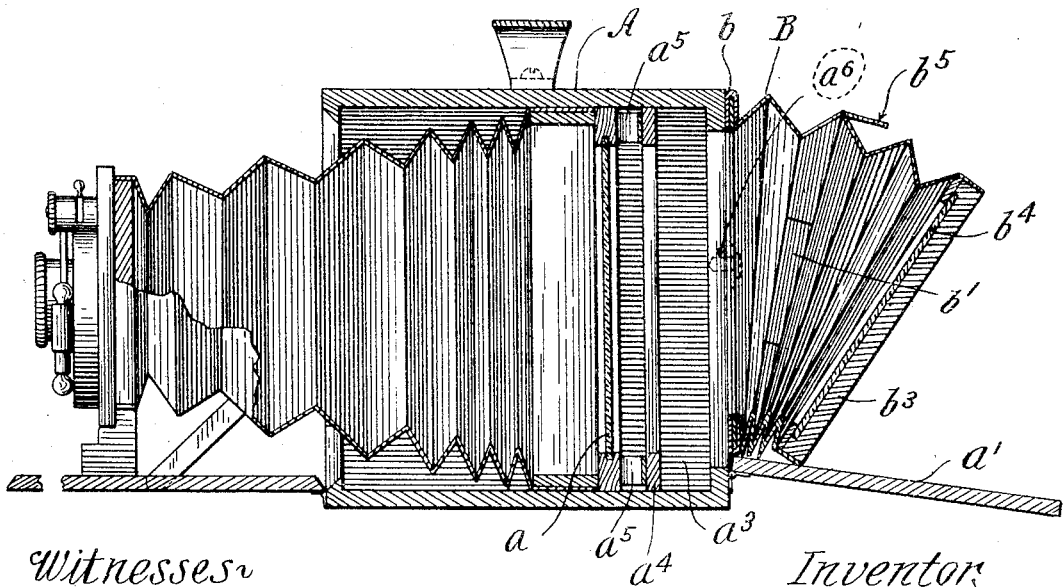

In the drawings, Figure 1 is a perspective view of a device embodying my invention, showing the same adapted to be secured upon the rear of any camera in which a screen is used to receive the image. Fig. 2 is a longitudinal vertical section of a photographic camera, showing the device applied thereto and in operative position. Fig. 3 is a fragmentary vertical section of the rear end of the camera, showing the device permanently secured therein and open. Fig. 4 is a similar view showing the device closed. Fig. 5 is a rear end elevation of a camera provided with a device embodying my invention. Fig. 6 is a view showing the camera operating on one side. Fig. 7 is a similar view with the attachment closed.

As shown in said drawings, referring first to Figs. 1 and 2, A indicates a camera of any desired form provided with a ground-glass screen $a$ in the usual manner, upon which the image is projected in the usual manner. In the construction shown the camera is provided with a rear door $a'$, adapted to open downwardly to permit inspection of the image while focusing. In the construction shown said camera is provided at its rear end with a compartment in which to carry extra plate-holders and is provided with an interior frame $a^4$, provided on its front side with a spring $a^5$, which acts to hold the holder of the plate to be exposed or the frame for the ground-glass screen in operative position. Secured on the rear end of the camera on each side of the door-aperture are set-screws $a^6$, one of which is shown in dotted lines in Fig. 2. These set-screws afford means for engaging the focusing attachment closely on the rear end of the camera. Said focusing attachment, as shown in said Figs. 1 and 2, comprises a detachable bellows of any suitable material and size, but which is preferably made as light and compact as possible. The front of said bellows is open and is provided with a marginal frame $b$ of any suitable material. As shown in the drawings, sheet metal is used, which is folded or bent over the margin of the bellows. One or more laterally-directed hooks $b^2$ projects from each side of the frame and affords means adapted to engage over the set-screws $a^6$, acting to bind the front of said bellows closely to the open and rear end of the camera, as shown in Fig. 2. The rear end of said bellows is closed by a back board $b^3$, of any suitable material, on the inner side of which is carried a mirror $b^4$, of any suitable reflecting material, faced toward the screen a, as shown in Fig. 2, and which receives the image therefrom. In the top of said bellows is an aperture closed by a flap $b^5$. Said aperture is so positioned that, having adjusted the mirror at a suitable angle with the screen, the operator, standing behind the camera when focusing the instrument, by looking downwardly in the bellows through said aperture sees the image in said mirror, which appears to him to be in an upright or normal position. In a similar manner an opening is provided in one side of the bellows and is closed normally by a flap $b'$, similar to the flap $b^5$ before described, so that when the camera is adjusted upon its side the mirror can be used as before described by turning the flap $b'$ outwardly, viewing the image through said aperture.

The invention may be permanently connected with many different forms in cameras, as shown in Figs. 3 to 7, inclusive, in which the camera is constructed as before described and is provided in its rear end with a double door comprising a frame C, hinged at the bottom of the camera and provided with hooks $c$ on each side adapted to engage suitable pins or catches set in the camera end, as shown in Fig. 5, and which act to hold said frame in position when closed within the camera end. Hinged on one side of and within the frame is a door $C'$, likewise provided with hooks adapted to engage pins carried on the frame C or other means acting to hold the door closed. A forwardly-facing mirror $b^4$ is secured on the inner face of the door $C'$, and secured within the rear end of the camera in position for the front face of the frame C to close against the same is a frame D. A bellows $B'$ is secured at its front end to said frame D, and the rear end thereof is secured to the front face of the door $C'$. Said bellows is provided with apertures in one side and at the top closed by the flaps $b^7$ $b^8$, respectively. Inasmuch as the bellows is secured to the door $C'$ and to said frame D, the opening of the frame C, with the door $C'$ closed therein, as shown in Fig. 3, adjusts the mirror at an angle with the screen. The mirror $b^4$ when moved at an angle with the screen $a$ enables the operater to view the image through the aperture normally closed by the flap $b^8$. Should the camera be adjusted on one side and the door $C'$ opened, the frame C being held within the camera, the mirror is adjusted thereby at an angle with the screen, as shown in Fig. 6, and operates as before described.

If preferred, the device may be constructed as last described and contained within a frame $A^2$, having the same height and width and exterior finish as the camera and of sufficient depth to permit the frame C, door $C'$, and frame D to fit therein. When so constructed, the device forms a slight rearward extension on the camera and if secured at the bottom to the camera by hinges $a^8$ affords a downwardly-opening door through which the interior of the camera is accessible.

The operation is as follows: In using the device the top of the bellows is drawn back, while the bottom remains closed, thus adjusting the mirror at an angle with the screen. The flap covering the aperture in the top of the bellows is then opened, enabling the operator standing behind the camera to see the image on the mirror through said aperture. As he looks downwardly and rearwardly therethrough the image to him appears to be upright. This enables him more readily to determine the focus and also to better determine the view desired.

When applied to old cameras, the device may be constructed as shown in Figs. 1 and 2 or in Figs. 6 and 7 or in any other convenient manner. It may also be constructed as a part of the camera when the camera is made as shown in Figs. 3 to 7, inclusive. Obviously, however, the attachment may be differently constructed and secured differently than shown, and any arrangement of parts at the rear of the screen whereby the inverted image on the screen is made to appear an upright image to the operator is embraced as a part of my invention, as obviously many details of construction may be varied without departing from the principles of the invention.

I claim as my invention—

1. As an article of manufacture an attachment for cameras comprising a reflector, light-excluding means engaged on the margin thereof adapted for engagement with the camera and permitting adjustment of either margin of said reflector with respect to the camera, said light-excluding means being provided with an aperture through which the image may be inspected from the reflector.

2. An attachment for cameras comprising a light-excluding hood adapted to be secured on the rear of the camera and having apertures therein, means normally closing said apertures and a reflecting medium within said hood and adapted to be inclined upwardly, downwardly or laterally behind the focusing-screen.

3. An attachment for cameras comprising a light-excluding hood adapted to be secured on the rear of the camera behind the focusing-screen, a reflecting medium in said hood adapted to be swung both vertically and laterally with respect to said screen, said hood having normally closed view-apertures therein through which the image on the reflector may be inspected.

4. A focusing attachment for cameras comprising a light-excluding hood adapted to be secured at the rear of the focusing-screen, a mirror therein facing said screen, said hood having normally closed view-apertures adapted to admit of reflection from the mirror, said mirror being adapted for arrangement at an angle with the screen in either of two directions.

5. A focusing attachment for cameras, a light-excluding bellows adapted to be secured at the rear end of the camera behind the focusing-screen, a mirror engaged thereon by means adapting either margin to be adjusted with respect to the screen, said bellows having normally closed view-apertures arranged to facilitate inspection of an image upon the mirror.

6. A door for a camera comprising a frame adapted to be hinged in the camera, a door hinged therein and opening laterally thereof, light-excluding extensible means connecting the frame with the margins of the door, adapting each of said margins to be adjusted to and from the camera and provided with normally closed view-apertures at the top and one side thereof and a mirror secured on said door and facing the focusing-screen of the camera and adapted by the opening of the door for adjustment at an angle therewith.

7. In a device of the class described a double door for cameras comprising a frame adapted to fit the rear end of a camera and hinged at the bottom thereof, a door fitting closely in said frame and hinged in one side thereof, a bellows connecting the margins of the door with the camera and a mirror secured in the inner face of the door and adapted thereby to swing downwardly at an angle from the focusing-screen when the door and frame are actuated and when the door only is opened to swing laterally at an angle therewith.

8. A rear end door for a camera having secured therein a mirror arranged to adapt either margin thereof to be adjusted with respect to the focusing-screen, light-excluding means connected with said door and camera and having normally closed apertures therein admitting examination of the mirror.

9. A rear door for cameras comprising a casing or frame having a length and width corresponding, approximately, with the rear dimensions of the camera end and hinged thereto, an inner frame hinged therein, a door hinged in the frame, a mirror in the inner face of the door, and a bellows secured to admit either the inner frame with the door or the door only to swing outwardly a bellows connecting the door with outer frame, and a mirror in the door.

In testimony whereof I have hereunto subscribed my name in the presence of two subscribing witnesses.

CONRAD W. HARTMANN.

Witnesses:
  C. W. HILLS,
  A. C. ODELL.